US012290476B2

(12) United States Patent
Schopler et al.

(10) Patent No.: US 12,290,476 B2
(45) Date of Patent: *May 6, 2025

(54) LATERAL ARM AND TORSO SUPPORT DEVICE

(71) Applicant: BONE FOAM, INC., Corcoran, MN (US)

(72) Inventors: Steven A. Schopler, Bakersfield, CA (US); Choll W. Kim, San Diego, CA (US); Benjamin J. Watters, III, Saint Louis Park, MN (US); Clinton J. McCullough, Blaine, MN (US); Peter A. Cole, Jr., North Oaks, MN (US)

(73) Assignee: Bone Foam, Inc., Corcoran, MN (US)

( * ) Notice: Subject to any disclaimer, the term of this patent is extended or adjusted under 35 U.S.C. 154(b) by 531 days.

This patent is subject to a terminal disclaimer.

(21) Appl. No.: 17/684,539

(22) Filed: Mar. 2, 2022

(65) Prior Publication Data

US 2022/0265500 A1 Aug. 25, 2022

Related U.S. Application Data

(63) Continuation-in-part of application No. 17/180,648, filed on Feb. 19, 2021, now Pat. No. 12,109,153, and (Continued)

(51) Int. Cl.
*A61G 13/00* (2006.01)
*A61G 13/12* (2006.01)

(52) U.S. Cl.
CPC ........ *A61G 13/0054* (2016.11); *A61G 13/122* (2013.01); *A61G 13/1235* (2013.01);
(Continued)

(58) Field of Classification Search
CPC .......... A61F 5/37; A61F 5/3723; A61F 5/373; A61F 5/3761; A61G 13/1235;
(Continued)

(56) References Cited

U.S. PATENT DOCUMENTS 3,694,831 A 10/1972 Treace
4,214,326 A 7/1980 Spann
(Continued)

OTHER PUBLICATIONS

International Preliminary Report on Patentability received for PCT Patent Application No. PCT/US21/18932, mailed on Sep. 1, 2022, 07 pages.

(Continued)

*Primary Examiner* — Adam Baker
(74) *Attorney, Agent, or Firm* — Workman Nydegger

(57) ABSTRACT

A lateral arm support device configured to support and anteriorly extend the arms of a patient away from the torso during a medical procedure. The lateral arm support device includes spaced apart panels, one forming a superior panel and the other forming an inferior panel, an upper arm support surface extending between the upper sides of the superior and inferior panels, and a lower arm support surface extending between the lower sides of the superior and inferior panels. The panels have shapes that define an anterior cutout extending from the anterior side of the lateral arm support towards the posterior side of the lateral arm support, beneficially allowing increased visualization and access to the lower arm of a patient. The lateral arm support device can be part of a patient positioning system configured to position a patient in a lateral decubitus position.

20 Claims, 12 Drawing Sheets

Related U.S. Application Data a continuation-in-part of application No. 29/728,091, filed on Mar. 16, 2020, now Pat. No. Des. 979,075.

(60) Provisional application No. 62/979,614, filed on Feb. 21, 2020.

(52) U.S. Cl.
CPC ....... *A61G 13/1285* (2013.01); *A61G 13/129* (2013.01); *A61G 13/1295* (2013.01); *A61G 2200/322* (2013.01)

(58) Field of Classification Search
CPC .............. A61G 13/124; A61G 13/1245; A61G 13/125; A61G 13/128–1295; A61G 13/0036; A61G 13/0054; A61G 13/009; A61G 13/02; A61G 13/04; A61G 13/08; A61G 13/12; A61G 13/1205; A61G 13/121; A61G 13/122; A61G 13/123; A61G 13/1255; A61G 7/065; A61G 7/1082–1098; A61G 2200/322; A47C 20/021; A47C 20/023; A47G 9/1054; A47G 9/1081; A47G 9/109
USPC .......................................................... 128/845
See application file for complete search history.

(56) References Cited

U.S. PATENT DOCUMENTS

| | | | | |
|---|---|---|---|---|
| D272,467 | S | 1/1984 | Nightingale | |
| D301,166 | S | 5/1989 | Miklja | |
| 4,901,384 | A | 2/1990 | Eary | |
| D321,760 | S | 11/1991 | Carney | |
| D325,087 | S | 3/1992 | Brinker | |
| 5,613,254 | A | 3/1997 | Clayman et al. | |
| 5,664,271 | A | 9/1997 | Bellavance | |
| 6,038,722 | A | 3/2000 | Giori et al. | |
| D426,307 | S | 6/2000 | Swedberg et al. | |
| 6,553,995 | B1 * | 4/2003 | Cole | A61F 5/01 5/632 |
| 7,017,215 | B1 * | 3/2006 | Singer | A61G 13/12 5/646 |
| 7,316,041 | B2 | 1/2008 | Guez | |
| 7,441,293 | B1 * | 10/2008 | Singer | A47C 20/023 5/632 |
| D657,468 | S | 4/2012 | Held | |
| 8,176,585 | B1 | 5/2012 | Isham | |
| D690,016 | S | 9/2013 | Ratner | |
| D698,030 | S | 1/2014 | Crisco et al. | |
| 8,850,634 | B2 | 10/2014 | Ponsi et al. | |
| D841,165 | S | 2/2019 | McCormack et al. | |
| D886,300 | S | 6/2020 | Marcil | |
| D954,967 | S | 6/2022 | Watters et al. | |
| D954,974 | S | 6/2022 | Watters et al. | |
| D954,975 | S | 6/2022 | Potter et al. | |
| D959,009 | S | 7/2022 | Zhou | |
| 2003/0167569 | A1 | 9/2003 | Newkirk et al. | |
| 2004/0133979 | A1 | 7/2004 | Newkirk et al. | |
| 2008/0301878 | A1 * | 12/2008 | Elhabashy | A61G 13/12 5/646 |
| 2010/0192300 | A1 | 8/2010 | Tannoury et al. | |
| 2012/0110742 | A1 | 5/2012 | Lawler et al. | |
| 2015/0026891 | A1 * | 1/2015 | Davis | A47G 9/1072 5/636 |
| 2017/0049651 | A1 | 2/2017 | Lim et al. | |
| 2018/0116891 | A1 | 5/2018 | Beale et al. | |
| 2021/0259900 | A1 | 8/2021 | Schopler et al. | |

OTHER PUBLICATIONS

International Search Report and Written Opinion received for PCT Patent Application No. PCT/US21/18932, mailed on May 4, 2021, 9 pages.

Saunders Lumbar Traction Device. Online, published date unknown. Retrieved on Sep. 13, 2022 from URL: https:// www.sourceortho.net/saunders-lumbar-traction-device/.

* cited by examiner

LATERAL ARM AND TORSO SUPPORT DEVICE

CROSS-REFERENCE TO RELATED APPLICATIONS

This application is a continuation-in-part of U.S. patent application Ser. No. 17/180,648, filed Feb. 19, 2021, which claims the benefit of U.S. Provisional Application No. 62/979,614, filed Feb. 21, 2020, and also a continuation-in-part of U.S. Design application No. 29/728,091, filed Mar. 16, 2020. The foregoing applications are incorporated herein by reference in their entirety.

BACKGROUND

Proper positioning of patients in the lateral decubitus position is extremely important in order to provide good operating conditions and effective access to the operative site. During surgery in the lateral decubitus position, patients are typically placed on their side in positions that are not completely physiologic and need to be stabilized and maintained in those positions for considerable amounts of time. This includes positioning the patient's arms and stabilizing the patient's torso to benefit both the patient and the surgeon. Improper positioning of the patient can lead to complications, resulting in severe patient disability and functional loss.

Patients come in a variety of shapes and sizes, and each therefore has unique positioning needs to provide the best access to the surgical site. The diversity of patient anatomy, as well as the significance of the damage that can result from improper positioning, underscore the challenges involved in patient positioning for the lateral decubitus position.

There are several different spine surgeries that use the lateral decubitus position. The lateral decubitus position is used for lateral approach procedures such as lateral lumbar interbody fusion (LLIF), oblique interbody fusion (OLIF), extreme lateral interbody fusion (XLIF), and direct lateral interbody fusion (DLIF). The lateral position is used less frequently than the prone position but is used for less invasive procedures and appears to be gaining in popularity.

The conventional approaches for lateral spine positioning have several limitations, however. For example, although tape is relatively inexpensive and readily available, its application takes time, it does not position or reposition well, it sticks to itself and is hard to handle, and it is not reusable. Other conventional positioning means include towels, pillows, and sheets. These could deform over time during the procedure, are time intensive to prepare, and may be overly bulky for some applications. The use of inflatable bags, such as IV bags, also involves limitations related to potential deflation, excessive time taken to inflate and position, and potential discomfort if over or under inflated.

The potential complications described above highlight the need for proper and safe patient positioning while also allowing the surgeon to gain effective access in a manner that minimizes procedure time.

Accordingly, there is an ongoing need for improved patient positioning systems. In particular, there is an ongoing need for an improved patient positioning system configured for positioning a patient in a lateral position in preparation for a lateral approach procedure.

SUMMARY

Described herein is a lateral arm and torso support device, which can be used and configured to position the patient in the lateral decubitus position and support the arms and stabilize the torso in preparation for a surgery that requires the lateral decubitus position. The disclosed device can be used for any lateral surgery as a non-operative surface and can support not just the arms but can stabilize the torso and prevent it from rolling forward. The clam shell like functionality, having a top and bottom piece, allows for easy rolling of the patient and positioning the patient without having to adjust IV lines on the lower arm.

The lateral arm and torso support device is configured to support the arms of the patient in a position (e.g., generally parallel) extending in the anterior direction away from the torso of the patient. The support device can also support the torso to help maintain the patient in the lateral decubitus position. In one embodiment, the lateral arm and torso support device includes a pair of spaced apart panels with one forming a superior panel and the other forming an inferior panel, an upper arm support surface extending between the upper side of the superior panel and the upper side of the inferior panel, and a lower arm support surface extending between the lower side of the superior panel and the lower side of the inferior panel. The panels have shapes that define an anterior cutout extending from the anterior side of the lateral arm and torso support device towards the posterior side of the support device, beneficially allowing increased visualization and access to the lower arm of a patient.

The lateral arm and torso support device can be adapted for use with other components of a patient positioning system. Other components of a patient positioning system may include one or more of a base section having a head bolster, an axillary bolster, a hip bolster, and a leg bolster, which is positionable between the legs of the patient and configured to support the legs of the patient and space the legs of the patient from one another.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

BRIEF DESCRIPTION OF THE DRAWINGS

Various objects, features, characteristics, and advantages of the invention will become apparent and more readily appreciated from the following description of the embodiments, taken in conjunction with the accompanying drawings and the appended claims, all of which form a part of this specification. In the Drawings, like reference numerals may be utilized to designate corresponding or similar parts in the various Figures, and the various elements depicted are not necessarily drawn to scale, wherein:

DETAILED DESCRIPTION

Disclosed herein is a lateral arm and torso support device that can be used to laterally support and position a patient's arms and torso while lying in the lateral decubitus position, such as during a surgery that requires the patient to be in the lateral decubitus position. The disclosed device can be used for any lateral surgery as a non-operative surface and can support not just the arms but can stabilize the torso and prevent it from rolling forward. The clam shell like functionality, having a top and bottom piece, allows for easy rolling of the patient and positioning the patient without having to adjust IV lines on the lower arm. The lateral arm and torso support device can be used as a component of an overall patient positioning system.

Before describing the lateral arm and torso support device in detail further below, the following is an example background environment that illustrates a lateral positioning system that includes a lateral arm and torso support device as a component thereof. It shall be understood that the lateral arm and torso support device can be used by itself and/or in combination with other components as desired.

Example Background Environment—Lateral Positioning System

Figure 1:
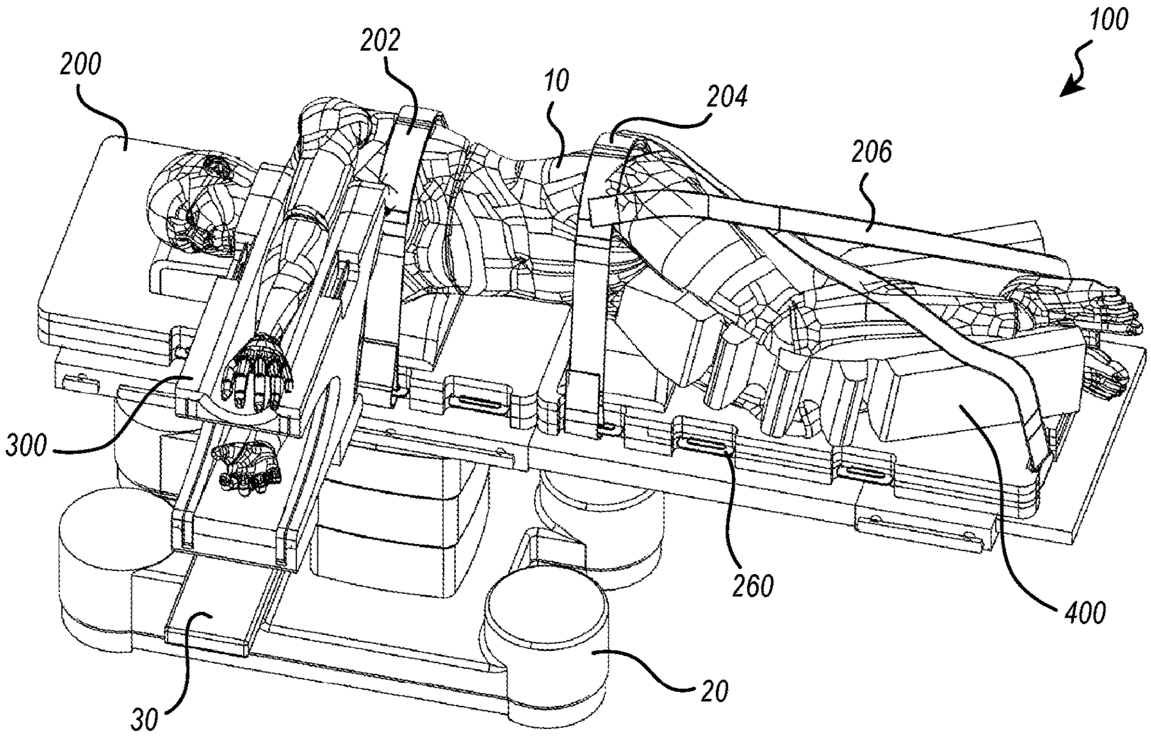
FIG. 1 illustrates an isometric view of a patient positioning system configured for positioning a patient in the lateral decubitus position, showing a patient positioned using the system.

FIG. 1 illustrates an example patient positioning system 100 utilizing a lateral arm and torso support device 300 as a component thereof with a patient 10 positioned thereon in the lateral decubitus position. The positioning system 100 can optionally include multiple subcomponents in addition to the lateral arm and torso support device 300, which may be assembled to form an overall positioning system 100. In this illustration, other subcomponents include a base section 200 and a leg bolster 400. The positioning system 100 allows the patient 10 to be positioned in the lateral decubitus position with the arms extending in an anterior direction using the lateral arm and torso support device 300. The positioning system 100 can be placed upon an operating table 20 that includes an arm board 30 for supporting the lateral arm and torso support device 300.

The example positioning system 100 can include a torso strap 202 that attaches to the base section 200 and/or operating table 20 and extends up and over the patient's torso to aid in securing the upper body of the patient in the desired lateral position. The positioning system 100 can include a hip strap 204 that attaches to the base section 200 and/or operating table 20 and extends up and over the patient's hip. One or more hip traction straps 206 can be attached to the hip strap 204.

Figure 2A:
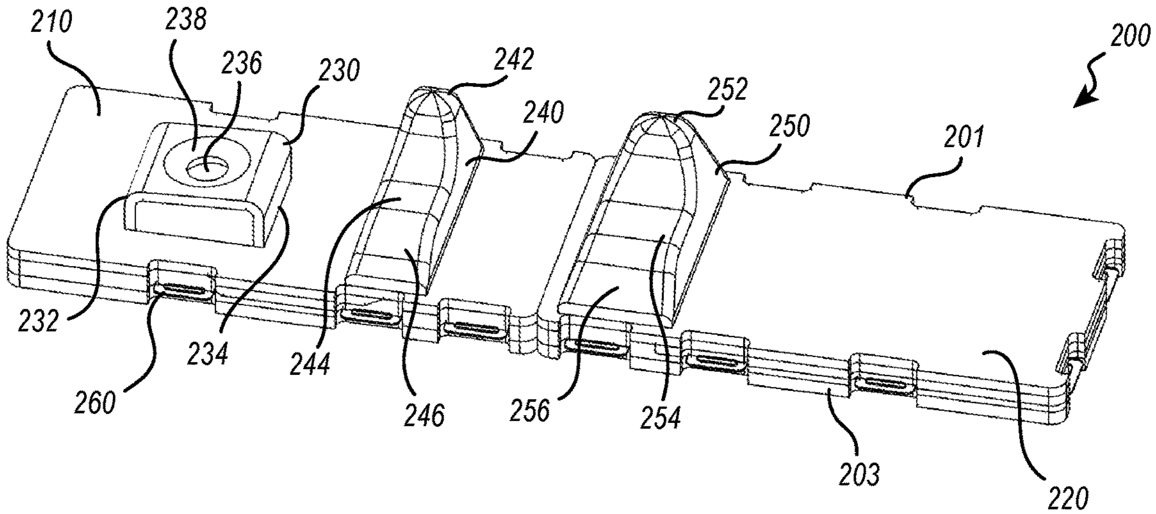
FIG. 2A illustrates a detailed perspective view of a base section of the patient positioning system.

FIG. 2A is perspective a view of an example base section 200 with other components removed. The base section 200 includes a superior portion 210 and an inferior portion 220, each having a posterior side 201 and an anterior side 203. The base section 200 includes a head bolster 230, an axillary bolster 240, and a hip bolster 250. The head bolster 230 includes a superior end 232, an inferior end 234, and an angled upper surface that slopes slightly downward from the inferior end 234 to the superior end 232. The head bolster 230 includes an ear cutout 236 to remove pressure points on the patient's ear when in the lateral position. A countersink 238 surrounds the ear cutout 236 and provides a transition between the ear cutout 236 and the upper surface of the head bolster 230.

The axillary bolster 240 includes a median surface 244 for supporting the downward facing side of the patient's chest just inferior of the shoulders. As illustrated in FIG. 1, the patient's down shoulder rests between the head bolster 230 and the axillary bolster 240. The axillary bolster 240 functions to raise the surrounding torso and relieve pressure on the down shoulder. The median surface 244 may be generally flat or may include a concave-shaped depression. The axillary bolster 240 includes a post 242 that rises above the median surface 244 and is disposed on the posterior side of the median surface 244. The post 242 functions to stabilize the patient when in the lateral position and prevents the patient from rolling back to the supine position. The axillary bolster 240 includes a wedge 246 disposed on an anterior side of the median surface 244 that angles downward from the median surface 244 in the anterior direction. The wedge 246 allows for easier placement of the axillary bolster 240.

The hip bolster 250 is similar in construction to the axillary bolster 240, and similarly includes a median surface 254, a post 252 posterior to the median surface 254, and a wedge 256 anterior to the median surface 254. The hip bolster 250 is preferably slightly taller and slightly wider than the axillary bolster 240, however.

Figure 2B:
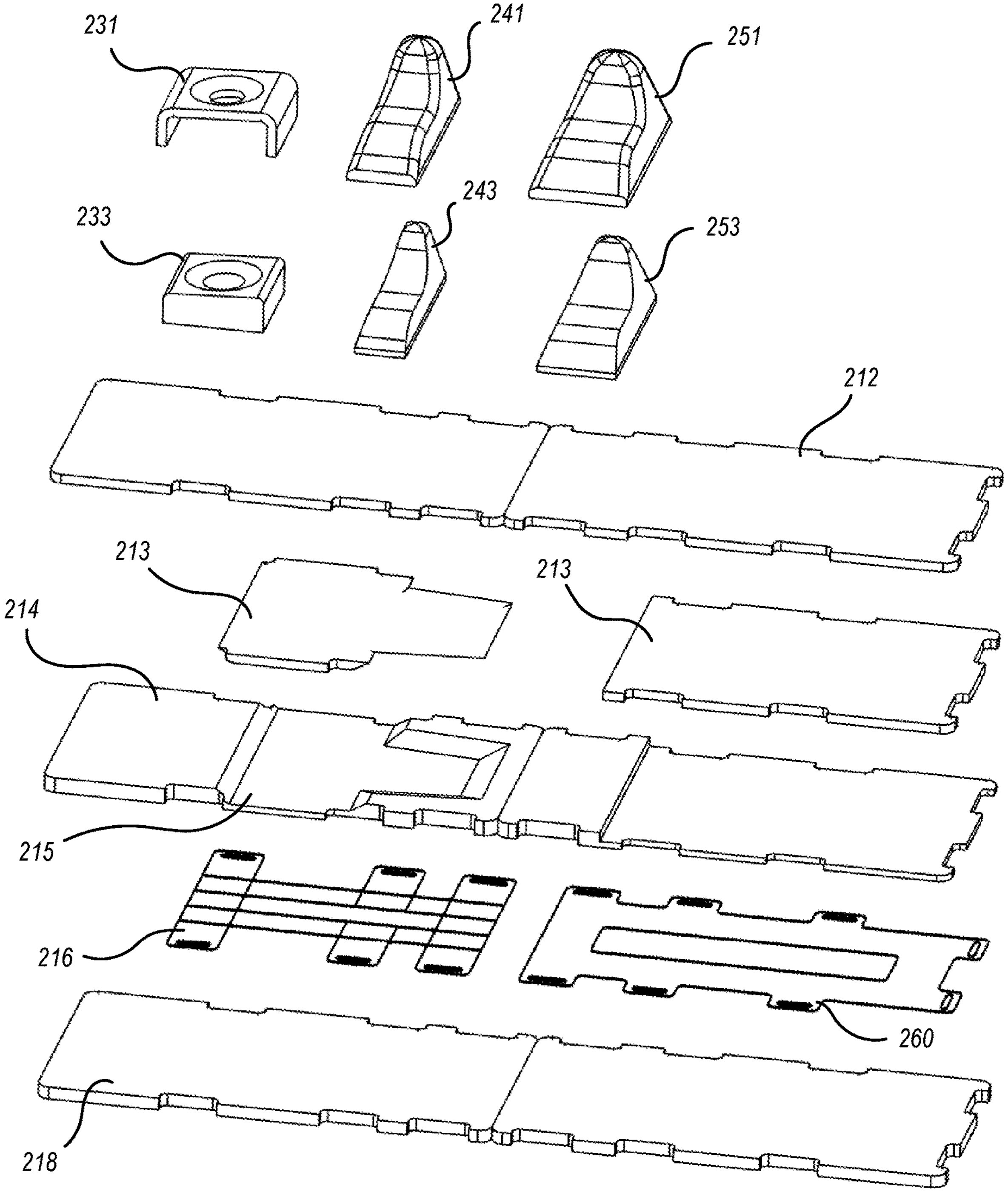
FIG. 2B illustrates an exploded view of the base section of FIG. 2A.

FIG. 2B illustrates an exploded view of the base section 200. Each of the head bolster 230, axillary bolster 240, and hip bolster 250 may include upper layers 231, 241, 251 and separate interior layers 233, 243, 253. The upper layers 231, 241, 251 are preferably formed from a soft, viscoelastic "memory" foam material. The interior layers 233, 243, 253 are preferably formed from a foam material with greater firmness to provide effective support and stability.

The base section 200 can include multiple layers, including an upper layer 212, a lower layer 218, a strap support layer 216, and an intermediate layer 214. The intermediate layer 214 includes cavities 215 for receiving soft pieces 213. The bulk of the intermediate layer 214 is formed from a relatively firm foam material to provide support to the base section 200. The soft pieces 213 nest within the corresponding cavities 215 of the intermediate layer 214 to form more cushioned areas for the shoulder and patient legs will be positioned. The soft pieces 213 may be formed from a relatively low 25% indentation load deflection (ILD) foam material.

The strap support layer 216 is preferably formed from two separate pieces to thereby integrate the strap supports 260 into a single structural component for the superior portion and a single structural component for the inferior portion. This beneficially enables forces applied to the strap supports to be better spread across the strap support layer 216 rather than focused at smaller regions immediately adjacent the strap supports 260. The strap support layers 216 may be formed from a relatively rigid material.

The lower layer 218 may be less firm than the intermediate layer 214. For example, the lower layer 218 may have a firmness that allows it to provide some structural support to the overall base section 200 and to pad the strap support layer 216 but to also compress somewhat under typical patient weight. In other embodiments, the lower layer 218 may be formed of a foam material that is relatively more firm, similar to the foam material of the intermediate layer 214.

Figure 3A:
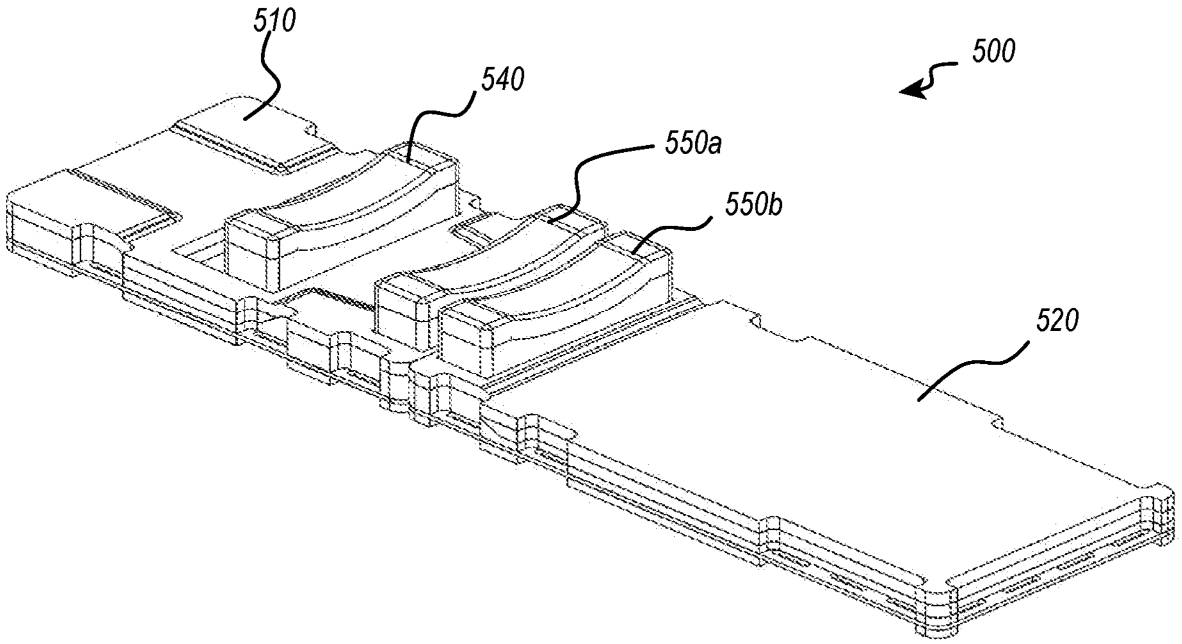
FIG. 3A illustrates a detailed perspective view of an alternative embodiment of a base section of the patient positioning system.
Figure 3B:
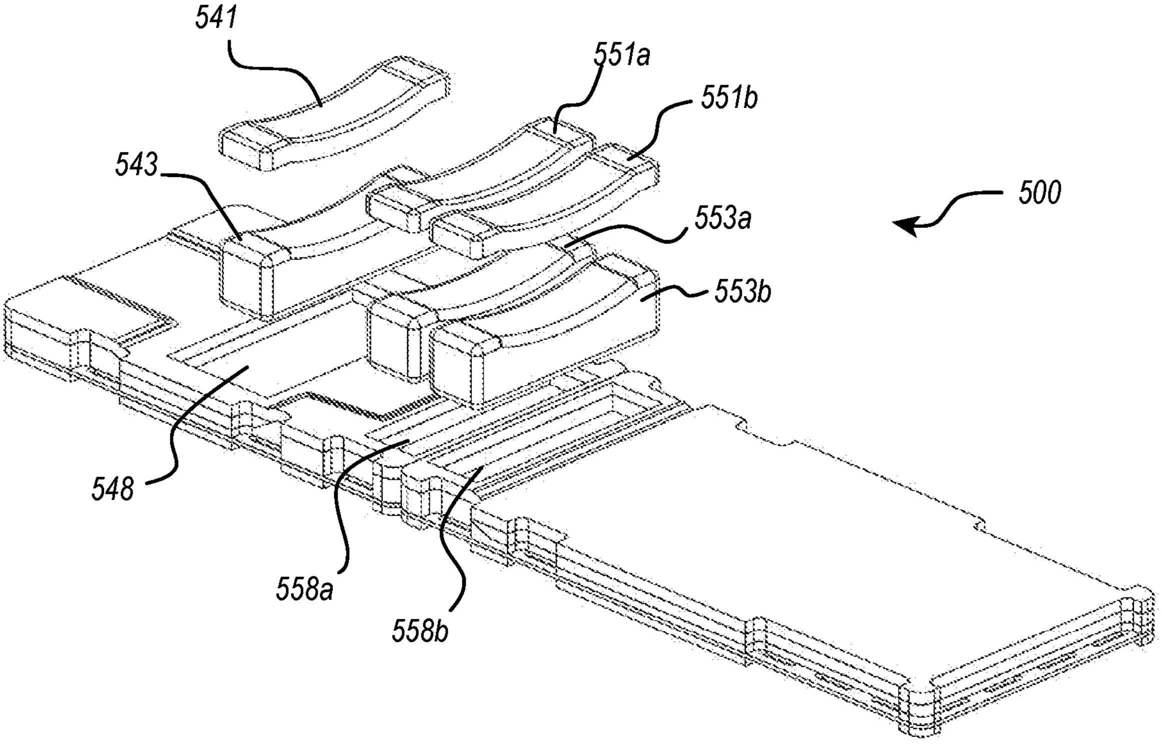
FIG. 3B illustrates an exploded view of the base section of FIG. 3A.

FIGS. 3A and 3B illustrate an alternative embodiment of a base section 500 that utilizes air bladders in conjunction with one or more bolsters to provide selective control of patient support and positioning. The features and components described above in relation to the base section 200 (including preferred materials, dimensions, and interaction with other components) remain applicable to the base section 500, with the exception of the differences described below.

As with the base section 200, the base section 500 includes a superior portion 510, an inferior portion 520, an axillary bolster 540, and a hip bolster (here formed by two separate bolster pieces 550*a* and 550*b*). In this embodiment, one or more of the bolsters 540, 550*a*, or 550*b* are operatively associated with a selectively inflatable air bladder. One or more of bolsters 540, 550*a*, or 550*b* can include ports and valves that provide connection to one or more pumps (e.g., a hand or foot pump) to enable operating room personnel to control the degree of inflation of the bladders. Personnel can beneficially adjust the amount of axillary and/or hip lifting on the fly without having to readjust padding components and without having to add or remove padding components. This minimizes patient movement during the procedure and allows for faster positioning maneuvers.

As shown in FIG. 3B, the bolsters 540, 550*a*, and 550*b* can include upper layers 541, 551*a*, and 551*b* that are separate from the bladders 543, 553*a*, and 553*b* themselves. The upper layers 541, 551*a*, and 551*b* may be formed from a soft, viscoelastic "memory" foam material as with the upper layers 241 and 251 of base section 200. The illustrated base section 500 includes cavities 548, 558*a*, and 558*b* configured to receive the air bladders 543, 553*a*, and 553*b*, respectively. The air bladders 543, 553*a*, and 553*b* may be attached to their respective cavities via friction fit, hook and loop fasteners, or other suitable attachment means.

The illustrated embodiment utilizes two separate bolsters 550*a* and 550*b* to function as a hip bolster. Other embodiments utilize a single, integrated air bladder and bolster to function as the hip bolster. There are certain advantages, however, in having separate hip bolster pieces. For example, with two separate bolster pieces, operating room personnel have more granular control over how the hip is supported, such as being able to add more air to the superior hip bolster 550*a* than the inferior hip bolster 550*b*, or vice versa.

In the illustrated embodiment, the superior hip bolster 550*a* is positioned on the superior portion 510 and the inferior hip bolster 550*b* is positioned on the inferior portion 520. This beneficially allows for a separate hip bolster portion to be positioned on each side of the bend when the base 500 is placed in the "jackknife" position, and thereby provides effective patient positioning control via adjustment of air bladders 533*a* and 533*b* as desired.

Figure 10A:
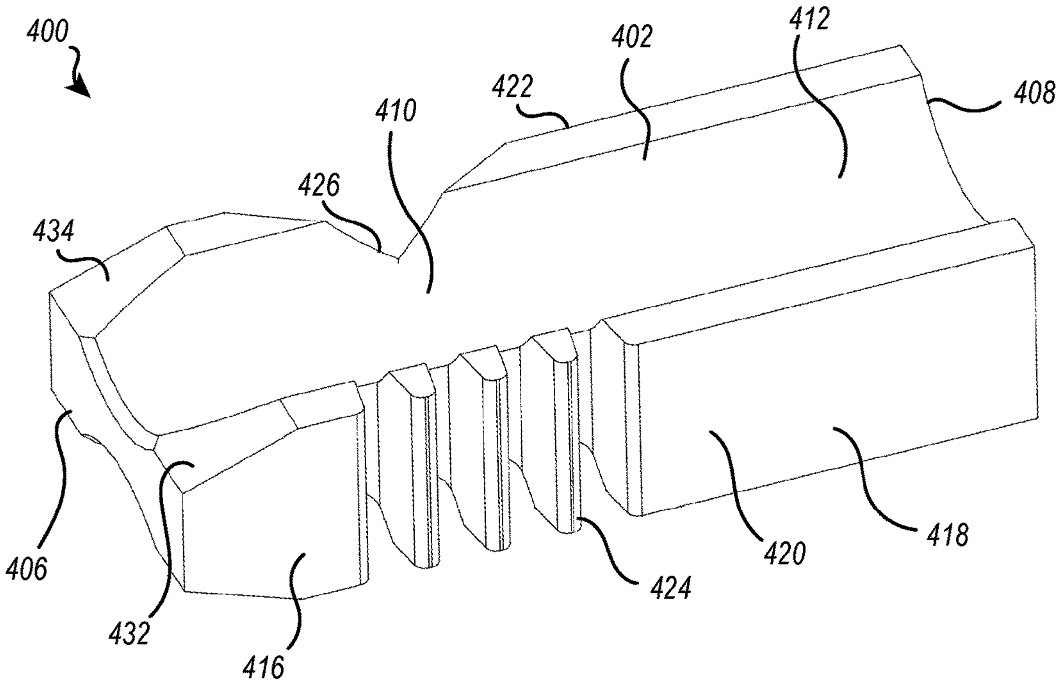
FIGS. 10A and 10B illustrate top and bottom perspective views of a leg bolster component of a patient positioning system.
Figure 10B:
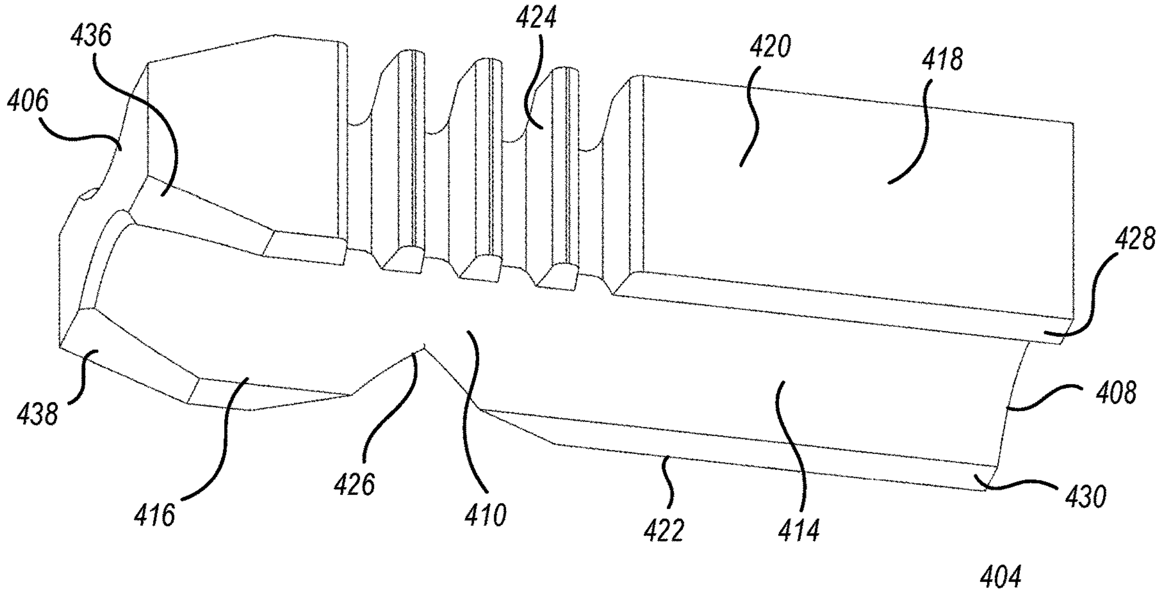
Figure 10C:
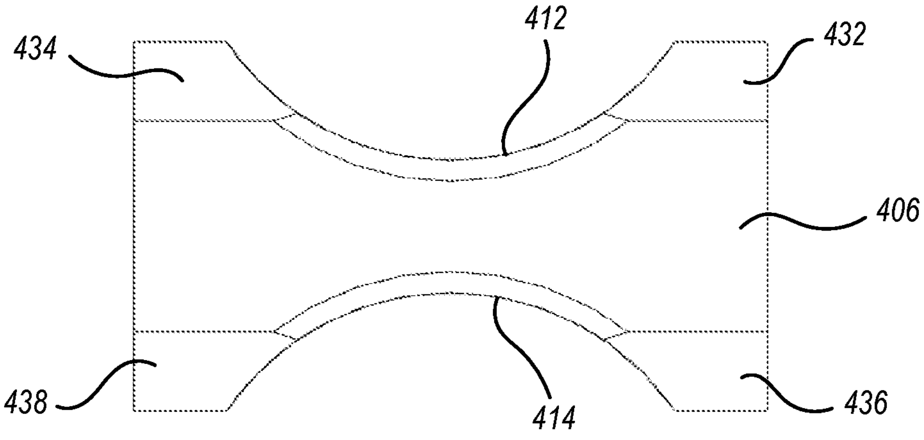
FIGS. 10C-10F illustrate front, back, and side views of the leg bolster component of FIGS. 10A and 10B.
Figure 10D:
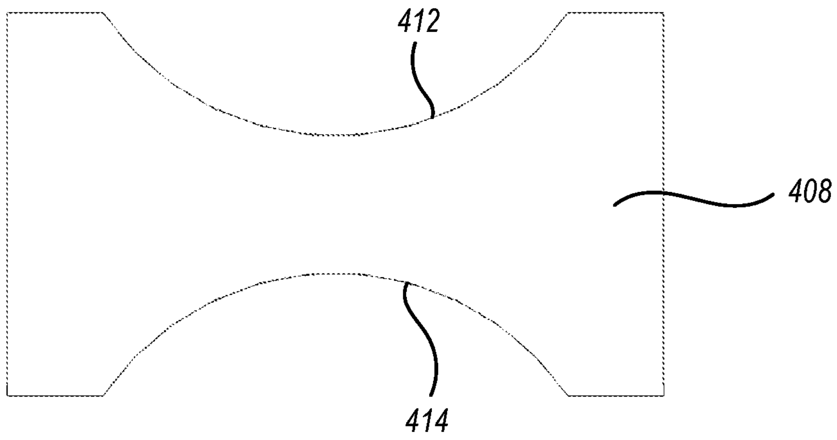
Figure 10E:
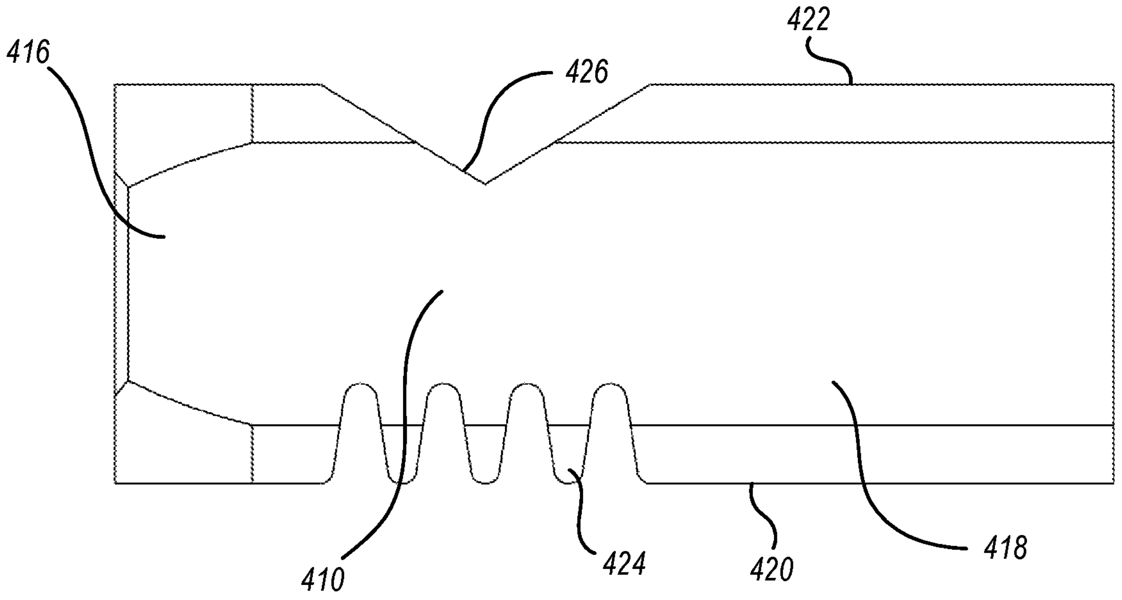
Figure 10F:
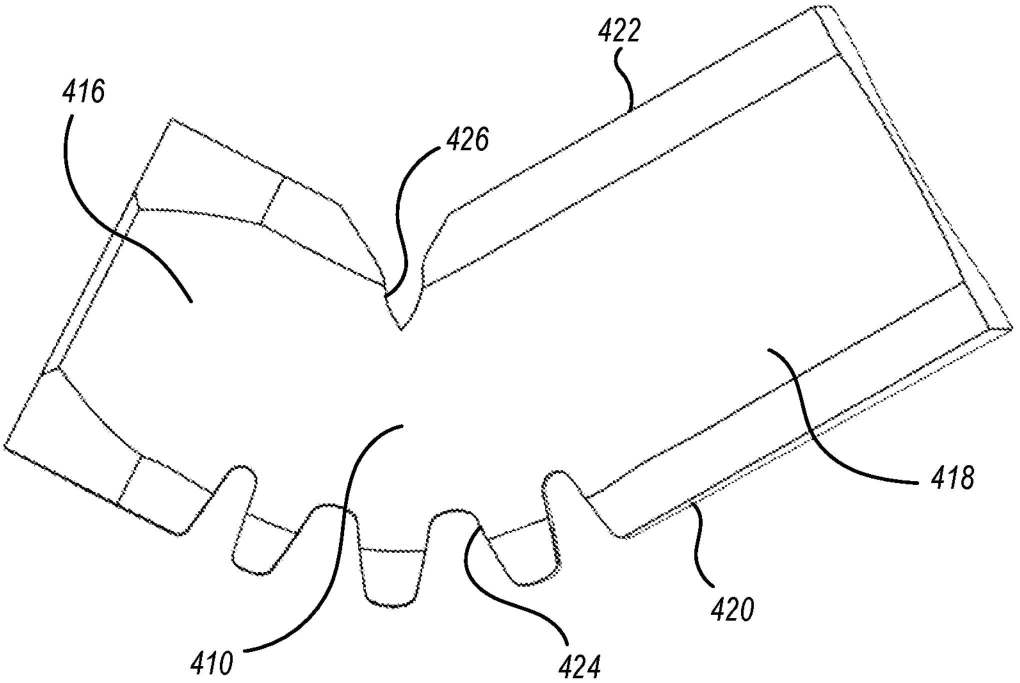

FIGS. 10A-10F illustrate various views of a leg bolster 400 shown in FIG. 1. FIG. 10A illustrates an isometric view of an upper side 402 of the device; FIG. 10B illustrates an isometric view of a lower side 404 of the device; FIG. 10C illustrates a view of a superior end 406 of the device; FIG. 10D illustrates a view of an inferior end 408 of the device; FIG. 10E illustrates a plan view of the device in an unflexed position; and FIG. 10F illustrates a plan view of the device in the flexed position.

The example leg bolster 400 includes an upper leg channel 412 extending from the superior end 406 to the inferior end 408 along the upper side 402, and a lower leg channel 414 extending from the superior end 406 to the inferior end 408 along the lower side 404 of the device. A knee flexion structure 410 is disposed between the superior end 406 and inferior end 408. The knee flexion structure 410 is configured to enable a superior portion 416 (the portion between the knee flexion structure 410 and the superior end 406) to flex and bend relative to an inferior portion 418 (the portion between the knee flexion structure 410 and the inferior end 408) in an anterior/posterior direction.

The knee flexion structure 410 includes an expandable element 424 disposed on an anterior side 420 of the device, and a compressible element 426 disposed on a posterior side of the device 422. The expandable element 424 and compressible element 426 function to allow the anterior side of the knee flexion structure 410 to stretch and expand and to allow the posterior side of the knee flexion structure 410 to collapse to allow the knee flexion structure 410 to function as a "joint" and thereby allow the inferior portion 418 and superior portion 416 to move relative to one another.

As shown in FIGS. 10A and 10B, the upper leg channel 412 is defined by an anterior sidewall 428 and a posterior sidewall 430. A superior segment 432 of the anterior sidewall and a superior segment 434 of the posterior sidewall may slope downward from the upper side 402 to the superior end 406 to form a groin portion 440 of the device. Corresponding superior segments 436 and 438 of the anterior and posterior sidewalls may slope upward from the lower side 404 to the superior end 406 to further define the groin portion. The groin portion provides a contoured, gradient width that better fits patient anatomy and allows better, more comfortable positioning of the patient's things into the device. The superior segments 432, 434, 436, 438 may be sloped at an angle of about 10 to about 40 degrees, or more preferably about 15 to about 30 degrees.

Lateral Arm and Torso Support Device

Figure 4:
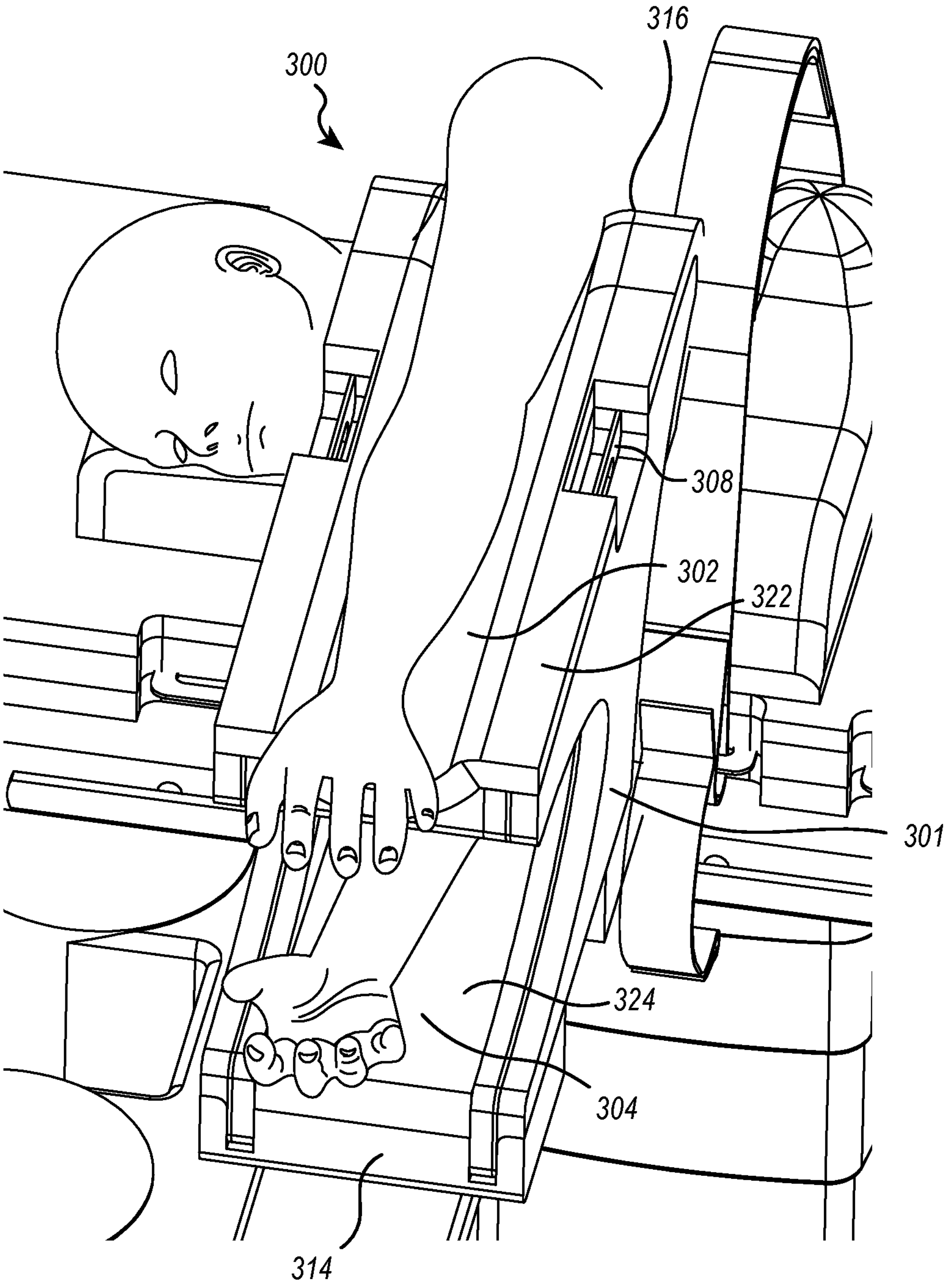
FIG. 4 illustrates an exemplary use of a lateral arm and torso support device, which can be part of a patient positioning system.

FIGS. 5A-9B illustrate an exemplary embodiment of a lateral arm and torso support device 300 (referred to herein as "arm and torso support device 300" or "support device 300"), in detail and exploded views, respectively. FIGS. 1 and 4 illustrate close-up views of exemplary uses of the lateral arm and torso support device 300.

Figure 5A:
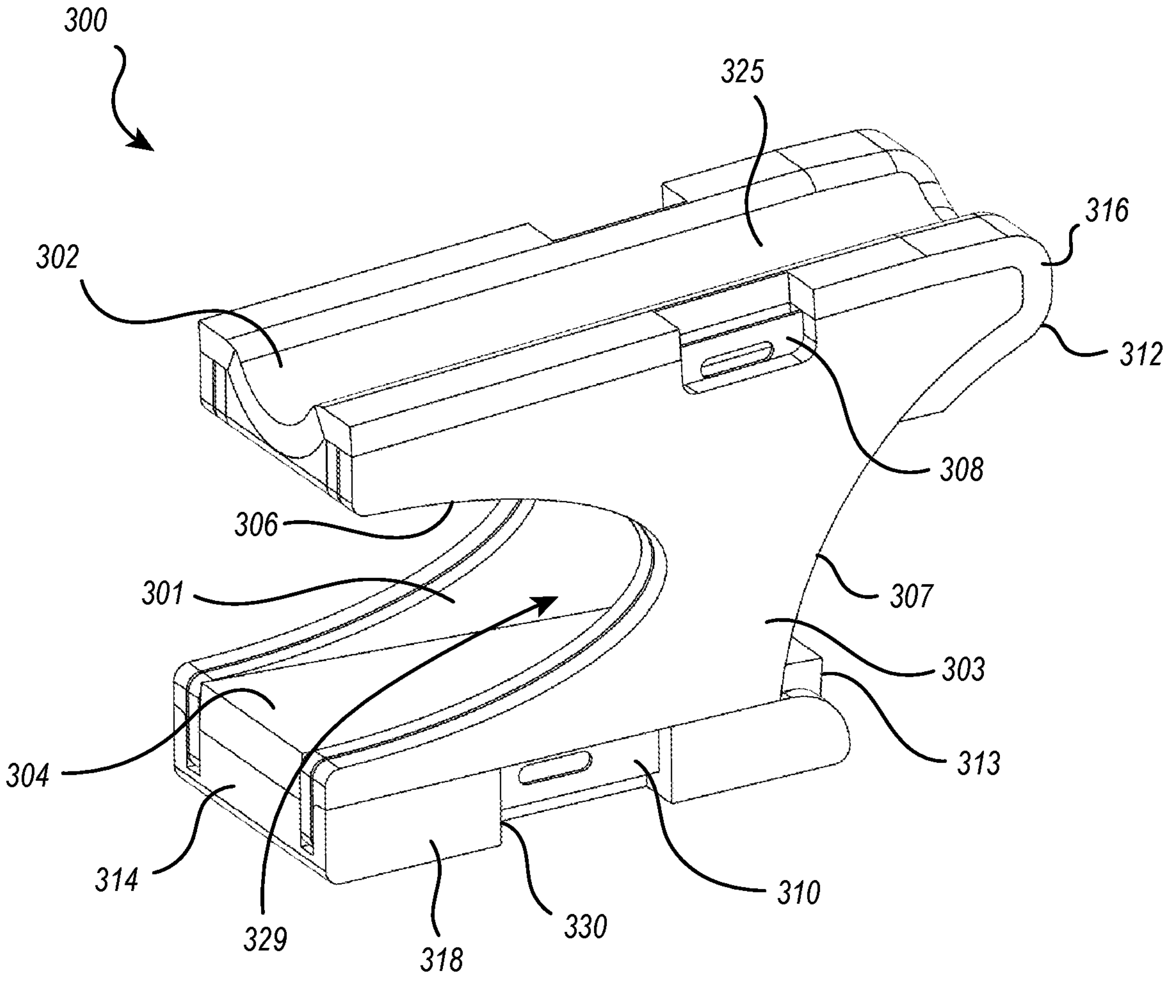
FIGS. 5A and 5B illustrate detailed perspective views of a lateral arm and torso support device.
Figure 5B:
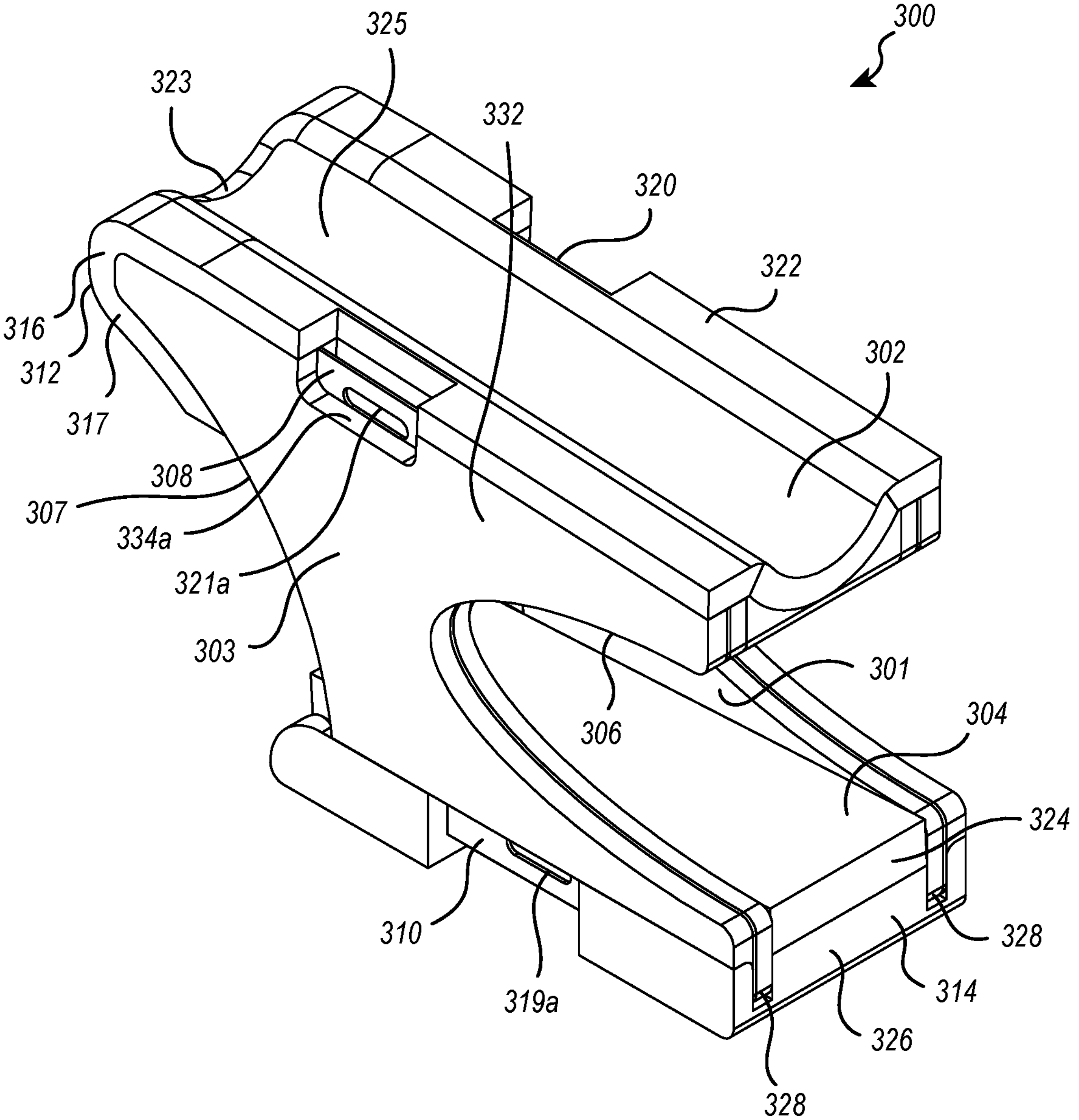

As shown in FIGS. 5A and 5B, the lateral arm and torso support device 300 is configured to support the arms of the patient in a position (e.g., generally parallel) extending in the anterior direction away from the torso of the patient. The support device 300 can also support the torso to help maintain the patient in the lateral decubitus position, as illustrated in FIGS. 1 and 4.

In some embodiments, the lateral arm and torso support device includes a pair of spaced apart panels 301, 303 with one forming a superior panel and the other forming an inferior panel. Whether one of panel 301 or panel 303 is the superior panel and the other is the inferior panel typically depends on which side the patient is lying on. As illustrated in FIGS. 1 and 4, panel 301 acts as the superior panel and panel 303 acts as the inferior panel. When the device is in use, the panels 301 and 303 are positioned upright, with one facing the superior direction (a superior panel) and one facing the inferior direction (an inferior panel).

The lateral arm and torso support device 300 further includes an upper arm support surface 302 extending between the upper side of the superior panel 301 and the upper side of the inferior panel 303, and a lower arm support surface 304 extending between the lower side of the superior panel 301 and the lower side of the inferior panel 303. The panels 301, 303 have shapes that define an anterior cutout 306 extending from the anterior side 314 of the lateral arm and torso support device 300 towards the posterior side 312 of the support device 300, beneficially allowing increased visualization and access to the lower arm of a patient.

The lateral arm and torso support device 300 may also include one or more upper arm strap supports 308 for fastening straps used for securing the patient's upper arm to the upper arm support surface 302, and one or more lower strap supports 310 for fastening straps used for securing the arm and torso support device 300 to the operating table (e.g., to the arm board of an operating table).

The upper arm support surface 302 and lower arm support surface 304 may be formed from a relatively soft foam material, such as one having a 25% indentation load deflection (ILD) of about 10 to about 35 pounds (about 4.54-15.88 kg), or more preferably about 15 to about 25 pounds (about 6.8-11.3 kg). The other pieces may be formed of firmer foam materials and may have an ILD of about 50 to about 120 pounds (about 22.7-54.4 kg), for example.

The panels 301, 303 are shaped so as to define an anterior cutout 306 extending from the anterior side 314 of the arm and torso support device 300 towards the posterior side 312 of the support device 300. The anterior cutout 306 provides increased visualization and access to the lower arm of the patient when the arms are positioned on the device, such as for managing intravenous lines. The anterior cutout 306 preferably has a parabolic shape 311, as shown, but may alternatively have other curved or non-curved shapes.

The anterior cutout 306 preferably extends inward posteriorly from the anterior side 314 a distance that is about 75% to about 125% of the height of the support device 300. Additionally, or alternatively, the anterior cutout 306 may extend a distance equal to about 25% to about 75% of the overall width of the support device 300 from anterior side 314 to posterior side 312. For example, the anterior cutout 306 may extend inward from the anterior end 314 a distance of about 6 to about 18 inches (about 15-46 cm), or about 8 to about 16 inches (about 20-40 cm), or about 10 to about 14 inches (about 25-36 cm). Such a cutout depth beneficially provides effective visualization and access to the lower arm of the patient while also maintaining overall structural integrity of the arm and torso support device 300 and maintaining a low-profile design in relation to the overall size of the arm and torso support device 300.

Figure 6:
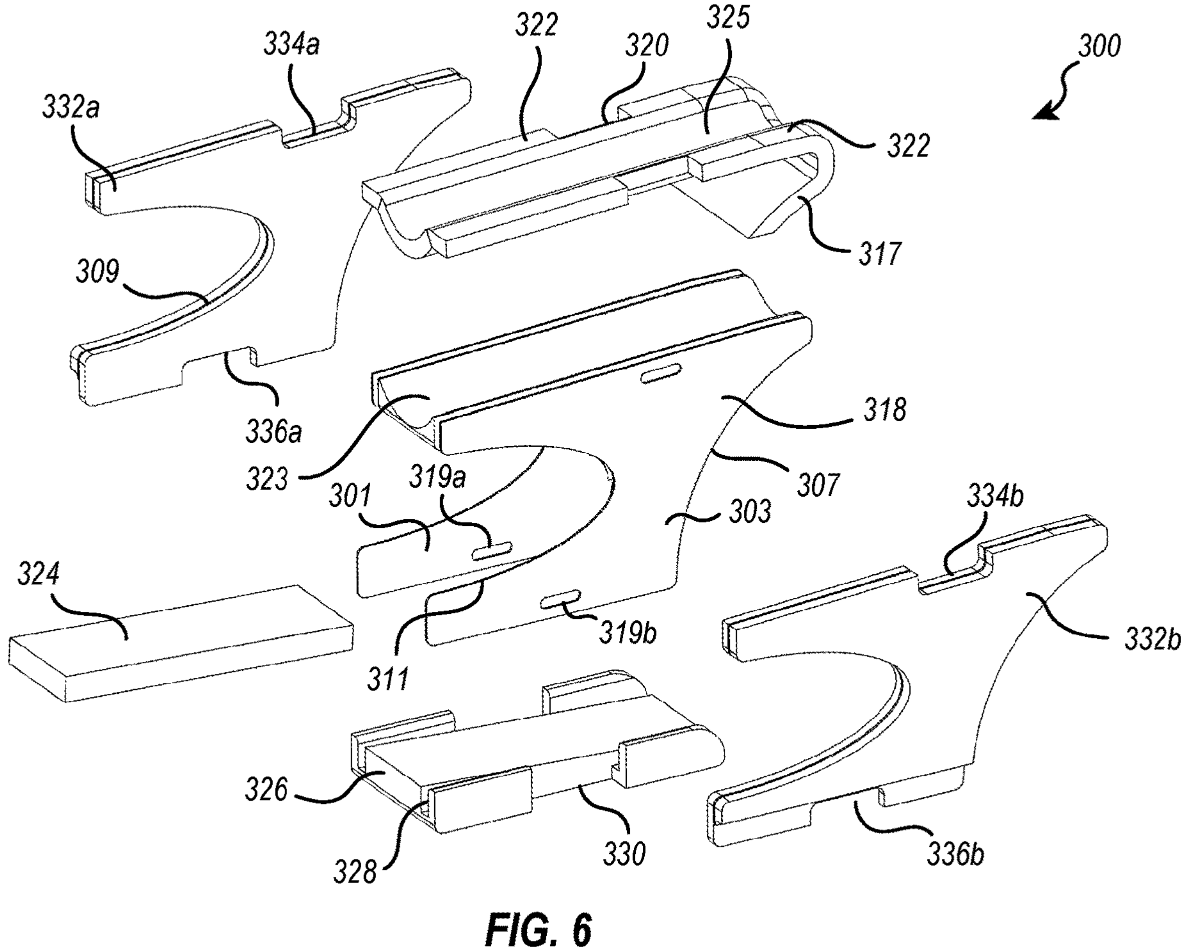
FIG. 6 illustrates an exploded view of the lateral arm and torso support device of FIGS. 4-5B.

The support device 300 may be made of separate pieces, as shown in FIG. 6, which allow for easy detachment and separation in a manner beneficial in light of patient positioning requirements. Other pieces formed of foam material of various firmness levels may be attached to the base piece 318 to form the arm and torso support device 300. Side pieces 332*a*, 332*b* are attached to the panels 301, 303. The side pieces 332 may include notches 334, 336 corresponding to the strap supports 308, 310. An upper piece 322 sits upon the base piece 318 to form the upper support surface 302. The upper piece 322 may include notches coinciding with the upper arm strap supports 308. The posterior portion of the upper piece 322 preferably wraps around to form a lip 317. The lip 317 helps define and provides padding to the chest bumper 316.

Figure 7A:
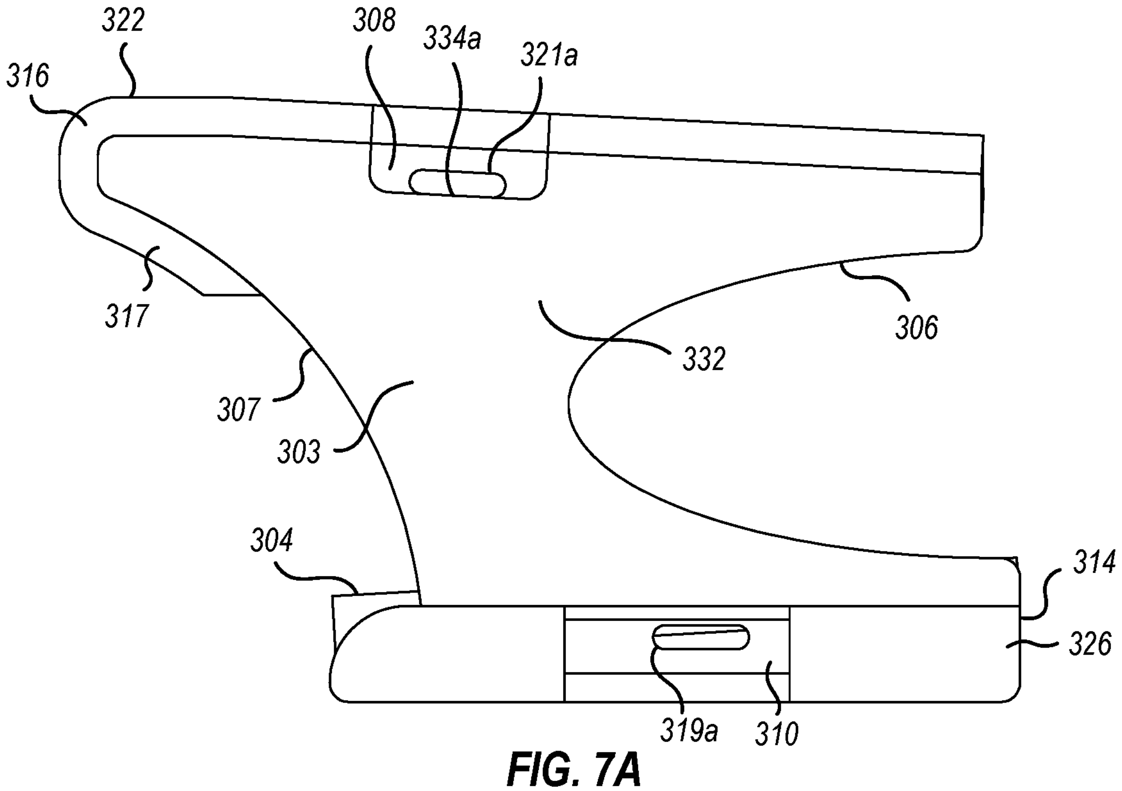
FIGS. 7A and 7B illustrate detailed side views of a lateral arm and torso support device of FIGS. 4-6.
Figure 7B:
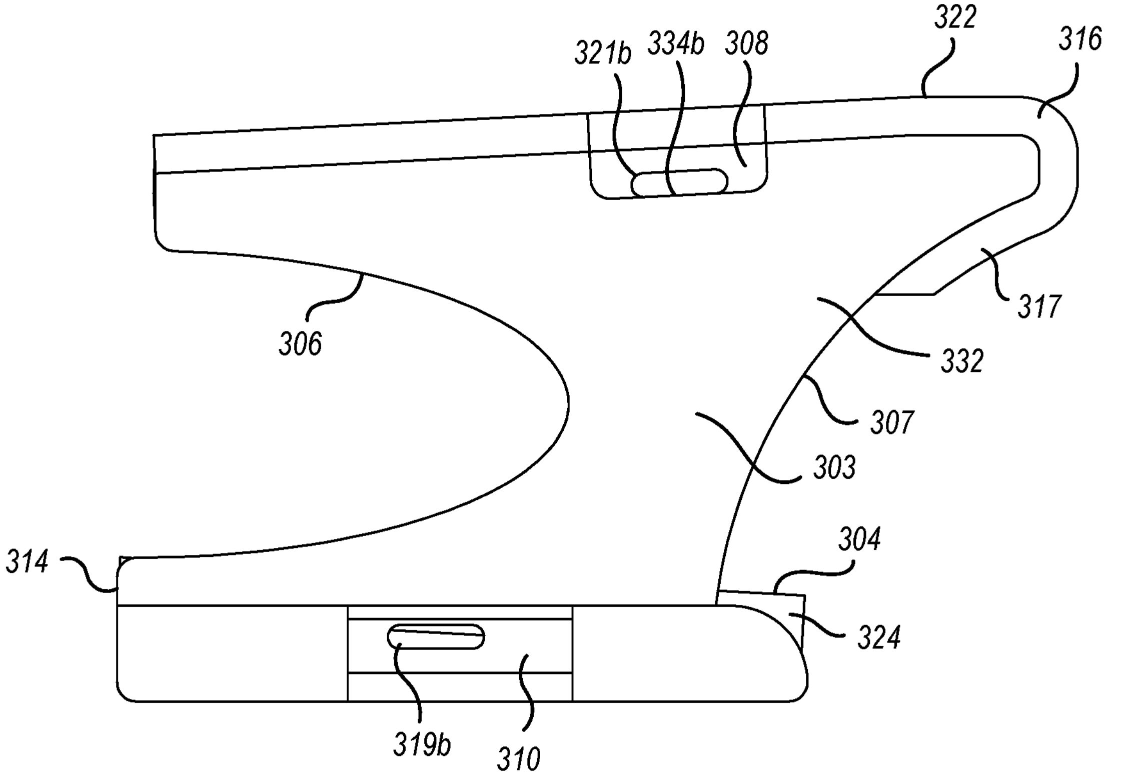

Turning now to FIGS. 7A and 7B, the upper arm support surface 302 preferably has a slight downward slope from the posterior end 312 to the anterior end 314 of the device, such as at an angle of about 2 to about 10 degrees, or about 3 to about 8 degrees or about 4 to about 7 degrees. On the other hand, the lower arm support surface 304 preferably has a slight upward slope from the posterior end 312 to the anterior end 314 of the device, such as at an angle of about 2 degrees to about 15 degrees, or about 3 degrees to about 12 degrees, or about 4 degrees to about 10 degrees, or about 5 degrees to about 8 degrees. This prevents excessive horizontal abduction extension of the patient's arms as well as excessive extension of the elbow, which beneficially reduces the risk of perioperative peripheral nerve injury (PPNI).

PPNI may be caused by direct trauma to affected nerve fibers or by ischemia of the nerve fibers. Prolonged stretching of peripheral nerves may lead to an increase in intraneural pressure and compression of intraneural capillaries and venules, which leads to a reduction in the perfusion pressure of the nerve fibers and associated disruption of axons and vasa nervosum. Prolonged compression may lead to an increase in intraneural and extraneural pressures, leading to a reduction in perfusion and therefore leading to ischemia and slowing of conduction through the nerve fibers. Prolonged ischemia of nerve fibers leads to demyelination and associated axonal damage. Specific forms of PPNI include ulnar neuropathy, brachial plexus injuries, median neuropathy, and radial neuropathy.

As shown in FIGS. 5A-7B, the upper arm support surface 302 may extend farther posteriorly than the lower arm support 304. In other words, the upper arm support surface 302 can extend horizontally beyond the terminus or posterior end 313 of the lower arm support surface 304. The posterior end 312 of the upper arm support surface 302 can form a chest bumper 316 that sits against the upward portion of the patient's chest and prevents forward anterior rolling of the patient.

Figure 8A:
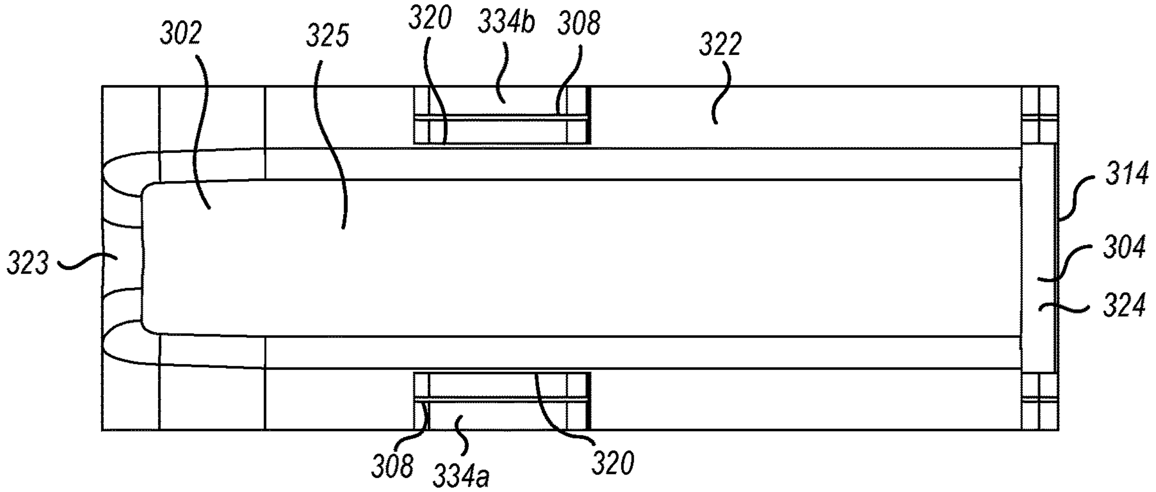
FIGS. 8A and 8B illustrate detailed top and bottom views, respectively, of a lateral arm and torso support device of FIGS. 4-7B.

FIG. 8A illustrates a top plan view of the arm and torso support device 300. The upper arm support surface 302 can comprise a central trough or groove 325 shaped to accommodate a patient's arm placed therein. The groove 325 can be centrally located between the upper pieces 322. The posterior end of the groove 325 can terminate at a smooth edge 323.

Figure 8B:
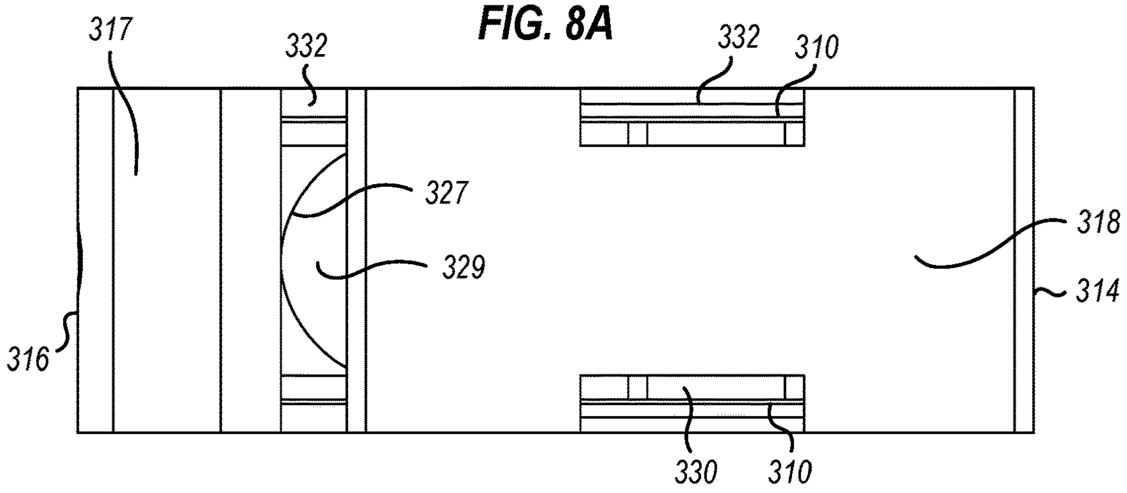

FIG. 8B illustrates a bottom plan view of the arm and torso support device 300. The support device 300 may include a base piece 318 that includes the panels 301 and 303. The base piece 318 may be formed of a relatively rigid material such as HDPE, ABS, and/or other suitable material, and may integrally include the upper strap supports 308 and lower strap support 310. The base piece can include a posterior cutout or curve 307 that extends anteriorly from the posterior end 312 of the device. This also aids in reducing the profile of the arm and torso support device 300 and in increasing visibility and access to the lower arm when it sits upon the lower arm support surface 304.

Figure 9A:
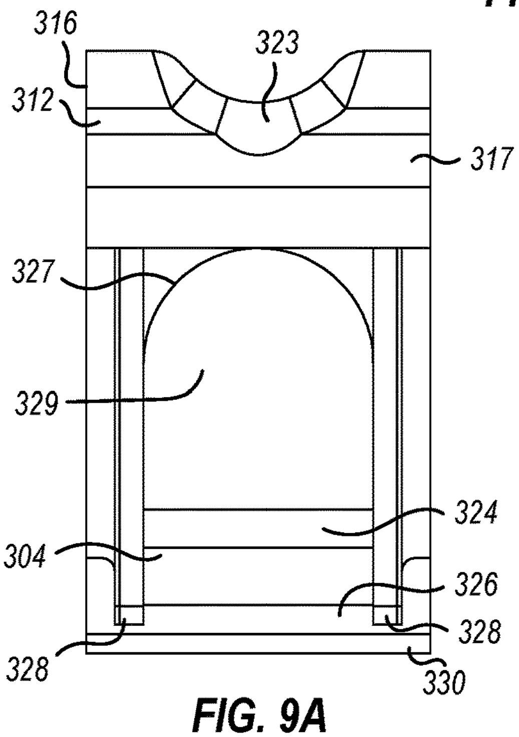
FIGS. 9A and 9B illustrate detailed front and back views, respectively, of a lateral arm and torso support device of FIGS. 4-8B.
Figure 9B:
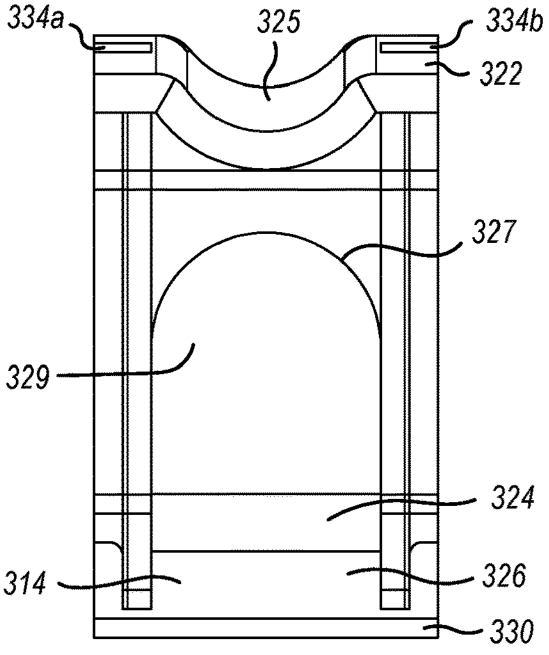

FIGS. 9A and 9B illustrate posterior and anterior views of the arm and torso support device 300. The support device 300 can include an arch 327 defining an opening 329 through which a patient's arm can be positioned during a procedure. The shape of the arch 327 can provide adequate space to allow for visualization of the patient's extremities to determine whether the patient is positioned correctly within the device.

A lower piece 326 includes grooves 328 into which the panels 301, 303 of the base pieces 318 fit. The base piece 318 may also include notches 330 to coincide with lower strap supports 310. Lower surface piece 324 is placed upon the base piece 318 to form the lower arm support surface 304.

FIGS. 1 and 4 illustrate close-up views of exemplary uses of the lateral arm and torso support device 300. The patient is lying in the lateral decubitus position with the arms extended anteriorly and the chest abutting or being adjacent to the posterior cutout 307 and the chest bumper 316. The posterior cutout 307 and chest bumper 316 help maintain the patient's torso in the lateral decubitus position.

In example uses, if a surgeon or healthcare worker desires greater access to the lower arm and/or needs to move the patient, the patient's upper arm can be first unsecured (e.g., unstrapped) and moved off the upper arm support surface 302. The upper sections of the support device 300, including the upper support surface 302 and panels 301, 303 may then be readily detached from the lower arm support surface 304 and moved out of the way. The patient's lower arm can then fully exposed and attended to and/or moved off of the lower arm support surface 304. The arm and torso support device 300 thus allows independent movement of the patient's upper arm or lower arm off of its respective support surface 302, 304 without requiring that the other arm be moved off its support surface at the same time.

Although the lateral arm and torso support device 300 is described herein in relation to the overall lateral decubitus patient positioning system 100, it may be used in other applications not necessarily limited to lateral decubitus position spine procedures and can be used alone or as part of another auxiliary patient positioning system. The lateral arm and torso support device 300 can be used for any procedure where it is beneficial or desired to support one or both of the patient's arms in an anteriorly extended position and support the torso in a lateral decubitus position.

CONCLUSION

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, or less than 1% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an," and "the" do not exclude plural referents unless the context clearly dictates otherwise. Thus, for example, an embodiment referencing a singular referent (e.g., "widget") may also include two or more such referents.

It will also be appreciated that embodiments described herein may include properties, features (e.g., ingredients, components, members, elements, parts, and/or portions) described in other embodiments described herein. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A lateral arm and torso support device configured to support the arms of a patient in a position extending in the anterior direction away from the torso of the patient, the support device comprising:

a pair of spaced apart panels including a superior panel and an inferior panel, each panel including an upper side, a lower side, a posterior side, and an anterior side and the panels together defining an upper side, a lower side, a posterior side, and an anterior side of the support device;

an upper arm support surface extending between the upper side of the superior panel and the upper side of the inferior panel; and a lower arm support surface extending between the lower side of the superior panel and the lower side of the inferior panel, wherein the panels have shapes that define an anterior cutout extending from the anterior side of the support device towards but not unto the posterior side of the support device, the cutout allowing increased access to the lower arm of the patient.

2. The lateral arm and torso support device of claim 1, wherein the upper arm support surface slopes downward from the posterior side to the anterior side of the support device.

3. The lateral arm and torso support device of claim 2, wherein the upper arm support surface slopes downward towards the anterior side of the support device at an angle of about 2 degrees to about 10 degrees.

4. The lateral arm and torso support device of claim 1, wherein the lower arm support surface slopes upward from the posterior side to the anterior side of the support device.

5. The lateral arm and torso support device of claim 4, wherein the lower arm support surface slopes at an upward angle from the posterior side to the anterior side of the support device at an angle of about 2 degrees to about 15 degrees.

6. The lateral arm and torso support device of claim 1, wherein a posterior portion of the upper arm support surface forms or includes a chest bumper to prevent forward anterior rolling of the patient.

7. The lateral arm and torso support device of claim 1, wherein the panels and upper arm support surface are selectively detachable from the lower arm support surface.

8. The lateral arm and torso support device of claim 1, wherein the lateral arm support is compatible for use with a patient positioning system for maintaining the patient in the lateral decubitus position.

9. The lateral arm and torso support device of claim 1, wherein the support device further includes upper strap supports and lower strap supports for attachment of at least one or more straps for securing the patient's extremities to the support device.

10. The lateral arm and torso support device of claim 1, wherein the support device includes an arch defining an opening through which a patient's arm is positioned during a procedure.

11. The lateral arm and torso support device of claim 10, wherein the arch provides space for visualization of the patient's extremities to determine proper patient positioning.

12. The lateral arm and torso support device of claim 1, wherein at least one of the upper arm support surface or the lower arm support surface is formed from a soft foam material having a 25% indentation load deflection (ILD) of about 10 pounds to about 35 pounds.

13. The lateral arm and torso support device of claim 12, wherein the soft foam material has an ILD of about 15 pounds to about 25 pounds.

14. The lateral arm and torso support device of claim 1, wherein the panels are formed from a foam material having an ILD of about 50 pounds to about 120 pounds.

15. The lateral arm and torso support device of claim 1, wherein the anterior cutout has a curved shape, the curve lying on a plane parallel to the panels.

16. The lateral arm and torso support device of claim 1, wherein the anterior cutout extends inward posteriorly from the anterior side of the device a distance of about 25% to about 75% of an overall width of the support device from anterior side to posterior side of the support device.

17. A lateral arm and torso support device configured to support the arms of a patient in a generally parallel position extending in the anterior direction away from the torso of the patient, the support device comprising:

a pair of spaced apart panels including a superior panel and an inferior panel, each panel including an upper side, a lower side, a posterior side, and an anterior side and the panels together defining an upper side, a lower side, a posterior side, and an anterior side of the support device;

an upper arm support surface extending between the upper side of the superior panel and the upper side of the inferior panel, wherein the upper arm support surface of the lateral arm support slopes downward from the posterior side to the anterior side of the support device; and a lower arm support surface extending between the lower side of the superior panel and the lower side of the inferior panel, wherein the lower arm support surface of the lateral arm support slopes upward from the posterior side to the anterior side of the support device, wherein the panels have shapes that define an anterior cutout extending from the anterior side of the support device towards but not unto the posterior side of the support device, the cutout allowing increased access to the lower arm of the patient.

18. The lateral arm and torso support device of claim 17, the upper arm support surface slopes downward towards the anterior side of the support device at an angle of about 2 degrees to about 10 degrees and the lower arm support surface slopes at an upward angle from the posterior side to the anterior side of the support device at an angle of about 2 degrees to about 15 degrees.

19. The lateral arm and torso support device of claim 17, wherein a posterior portion of the upper arm support surface forms or provides a chest bumper to prevent forward anterior rolling of the patient.

20. The lateral arm and torso support device of claim 17, further comprising upper strap supports and lower strap supports for the attachment of at least one or more straps for securing the patient's extremities to the support device.

* * * * *